2 Sheets—Sheet 2
J. C. RICHARDSON & T. R. MORGAN.
Die for Making Threshing-Machine Teeth.
No. 207,069. Patented Aug. 13, 1878.
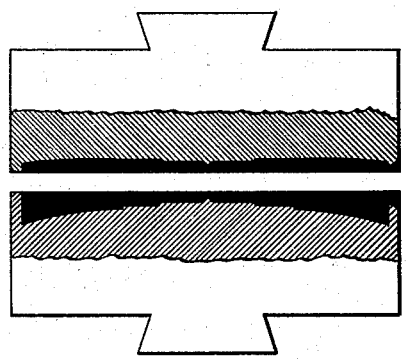
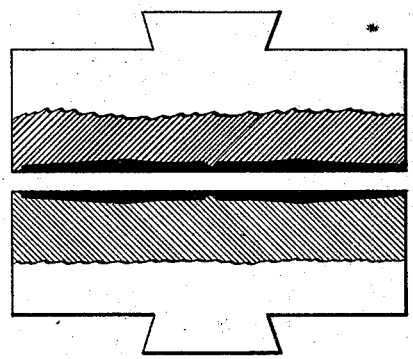
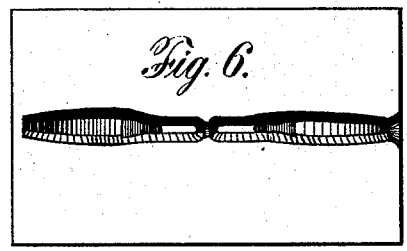
Fig. 6.
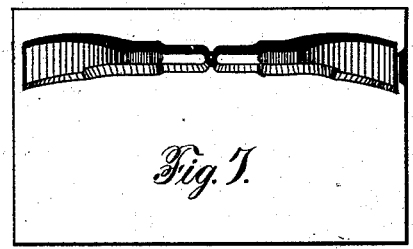
Fig. 7.
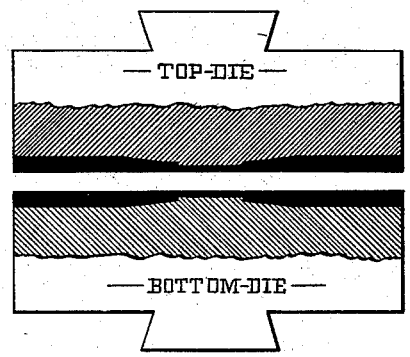
— TOP-DIE —
— BOTTOM-DIE —
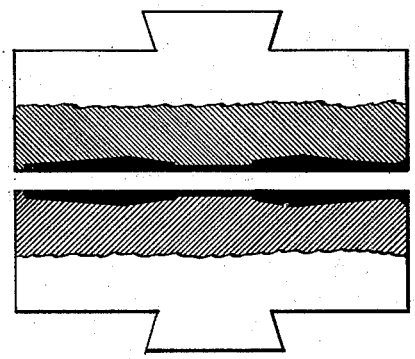
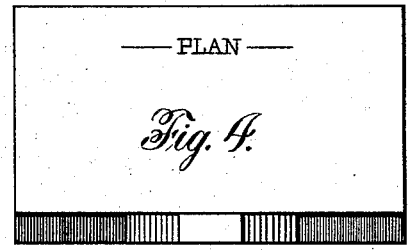
— PLAN —
Fig. 4.
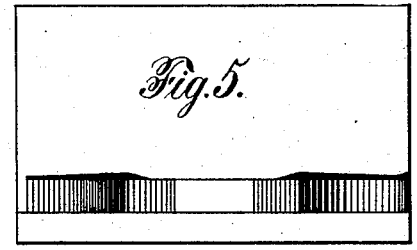
Fig. 5.
Witnesses: Jno. R. Williams, Chas. R. Morgan
Inventors: Julius C. Richardson, Thos. R. Morgan
N. PETERS, PHOTO-LITHOGRAPHER, WASHINGTON, D. C.

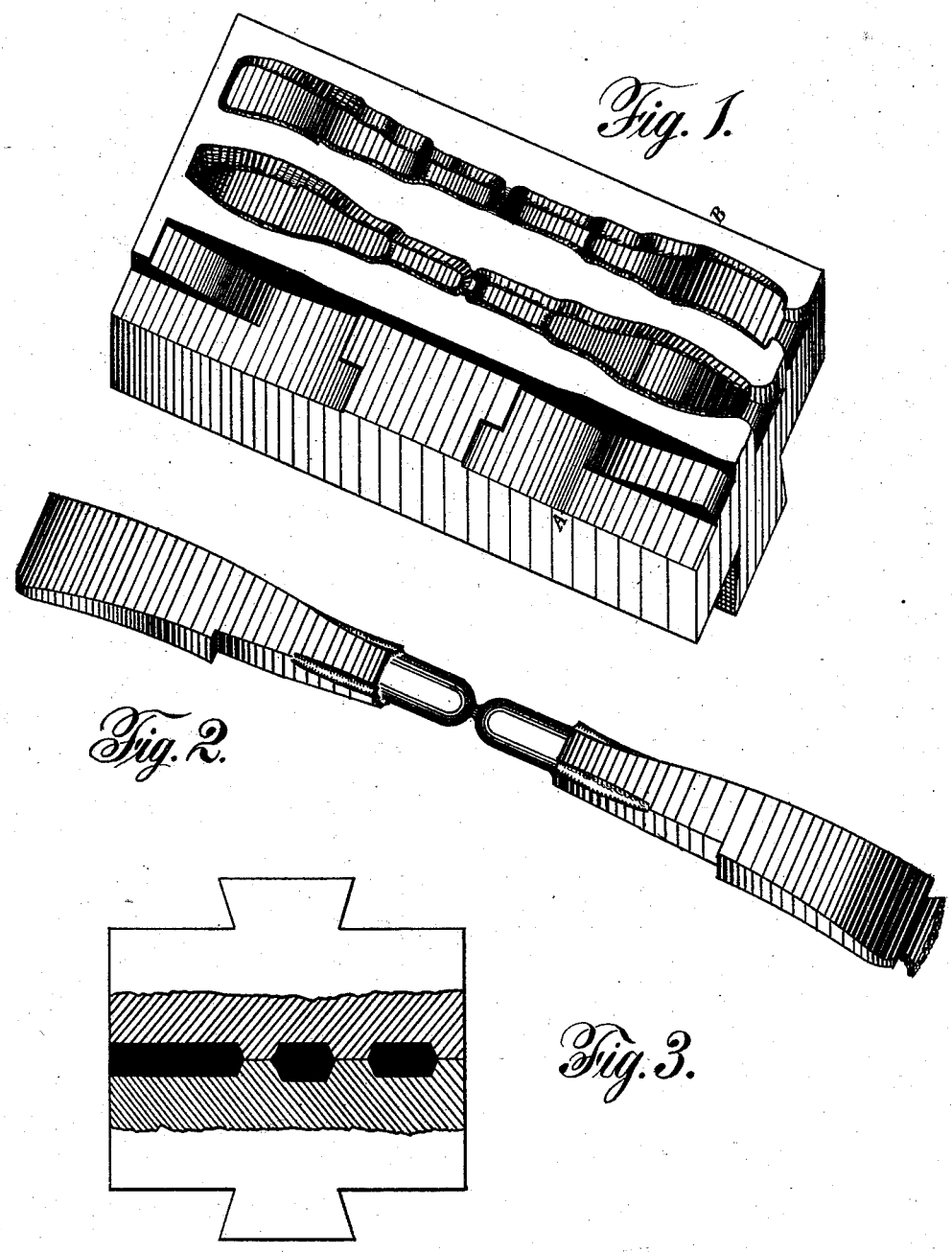

UNITED STATES PATENT OFFICE.

JULIUS C. RICHARDSON, OF MANLIUS, NEW YORK, AND THOMAS R. MORGAN, OF ALLIANCE, OHIO.

IMPROVEMENT IN DIES FOR MAKING THRASHING-MACHINE TEETH.

Specification forming part of Letters Patent No. 207,069, dated August 13, 1878; application filed June 22, 1878.

*To all whom it may concern:*

Be it known that we, JULIUS C. RICHARDSON, of Manlius, in the county of Onondaga, State of New York, and THOMAS R. MORGAN, of Alliance, in the county of Stark, State of Ohio, have invented certain new and useful Improvements in Dies for Making Finless Thrashing-Machine Teeth and other forgings; and we do hereby declare the following to be a full, clear, and exact description of the invention, such as will enable others skilled in the art to which it pertains to make and use it, reference being had to the accompanying drawings, which form part of this specification.

Figure 1, Sheet 1, is an isometrical view of bottom die. Fig. 2, Sheet 1, is a perspective view of two finless thrashing-machine teeth. Fig. 3, Sheet 1, is a cross-sectional view of dies through A B. Fig. 4, Sheet 2, is a part longitudinal sectional elevation and a plan view, showing the first mold in forming teeth. Fig. 5, Sheet 2, is a part longitudinal sectional elevation and a plan view, showing the second mold in forming teeth. Fig. 6, Sheet 2, is a part longitudinal sectional elevation and a plan view, showing the third mold in forming teeth. Fig. 7, Sheet 2, is a part longitudinal sectional elevation and a plan view, showing the fourth mold in forming teeth.

The object of our invention is to provide dies which are adapted to forge thrashing-machine teeth without forming fins thereon, and without waste of material.

The first two forms or drawing-down molds, Figs. 4 and 5, are so shaped on their surfaces that the metal can be pressed or hammered down roughly to the irregular shapes of the forgings required by turning the forging over on its side back and forth one quarter or one half turn once, or repeated, if necessary. The second two forms or finishing-molds, Figs. 6 and 7, are so shaped at the top and bottom as to have the exact configuration of the two flat sides of the tooth and the longitudinal edges bounding the same. The side walls of the dies are formed outwardly inclining or beveled, so as to allow the metal to swell out without having fins formed thereon between the upper and lower dies.

This new feature of beveling the sides and rounding the top edges of walls of thrashing-machine molds, allowing the metal to swell out instead of finning, enables us, by turning the forging over continually, to drive down the over-swelled sides into the bottom shapes of dies and finish in detail all the sides to the exact shape of bottom of molds, which are made to the exact configuration of the forging, so it can be seen that the metal swells out into the bevel sides of molds, to be driven back again into the forging by another pressure. The other herein-described methods would form the swelling we make into a thin fin between the dies, as their molds are made to the exact form of forging.

The first two roughing molds or forms in dies may be made in some cases into one mold or form when the forgings are the same character on face of either top and bottom die.

The method of operation is as follows: A bar of metal is placed on the die or mold, (shown in Fig. 4, which represents a detached view of the roughing or breaking-down mold, the same being also clearly shown on the outer edge of the die in Fig. 1,) and the hammer or press is allowed to cause the counterpart or upper die to force the metal into this form, and at each relief stroke of hammer or press the bar is turned over one quarter or one half turn, which operation is repeated as often as necessary, so as to draw down all the parts of the forgings; then the bar is moved onto the form or mold, Fig. 5, to receive a flattening pressure or the shape required. The forging is now carried over to next mold, Fig. 6, then turned over one quarter or one half turn into Fig. 7, and the same operation repeated in Figs. 6 and 7, if necessary.

By our method it will be seen that not one of our forms or molds is the exact mold of the shape being pressed, the two last molds, Figs. 6 and 7, having their bottom faces only to the exact face forms of the forgings to be operated upon, the side walls being amply tapered and rounded off on either side.

The methods heretofore practiced have been to make the finishing-molds in dies of the exact configuration of the thrasher-tooth, which requires the metal to be heated to a very high heat, which is, in many cases, injurious. In all such cases an overplus of metal is always necessary to operate on, so that the molds will be completely filled, and a thin fin is formed around center of length of thrasher-tooth or other forgings.

It becomes necessary to pass all forgings made by this process into a punching or stripping press which has attached to it a punch and die to the exact form of the forging being made. The teeth or forgings are pressed through this die by the punch, and the fin is cut off.

By another process in making thrasher-teeth, the metal is passed over a first mold and bent, and the next mold is made of the exact form of bottom and sides of tooth, and the hammer or press forces the metal, throwing out a fin, which has to be stripped off, as described. By the latter process the first cost of dies is great, as the dies have to be first made to an exact counterpart of the teeth or forging to be made, and must be continually kept up to that shape. The pressure exerted must also be much greater, as the metal has to be forced in against the walls to fill the mold. This fin formed becomes so chilled that, after a short use of the dies, the edges of the molds or forms soon become damaged, necessitating continual repair, besides the additional process necessary to trim the teeth by a special machine.

With our improved dies it becomes evident that we gain many advantages over the various methods in making thrashing-machine teeth. Our forming-dies are easier made, and cost less to make and to keep in order. The dies are only made in the face configuration at bottom. The sides are amply beveled and rounded off.

The operation of making the finless thrasher-teeth or other forgings is not so hard on the dies as by the other methods specified, as the forging is done in detail on two sides at a time only, changeable at each operation. Such dies will last much longer in order, and at the same time complete the forging without additional trimming or waste of metal, as required by the other methods.

By our improved method the forgings made are of a superior character, as they are hammered or pressed in detail on all sides at a low heat, by which operation the metal is made more dense and homogeneous.

We are aware that other patents have been granted for making thrashing-machine teeth and other forgings. We do not broadly claim such.

We are aware that dies have been constructed with finishing-molds having rounded edges or walls, and also dies having roughing or breaking-down molds provided with outwardly-flaring sides; and hence we make no claim to such features of construction.

Having thus described our invention, what we claim as new, and desire to secure by Letters Patent, is—

In a pair of dies for the manufacture of thrashing-machine teeth, roughing-molds and finishing-molds, substantially as described, the latter having die-surfaces of the desired configuration to be imparted to the sides and edges of the teeth, and with walls outwardly flaring from said die-surfaces, substantially as set forth.

In testimony whereof we have signed our names to this specification in the presence of two subscribing witnesses.

JULIUS C. RICHARDSON.
THOS. R. MORGAN.

Witnesses:
JNO. R. WILLIAMS,
J. R. MORGAN.